US007647351B2

(12) United States Patent
Monsarrat

(10) Patent No.: US 7,647,351 B2
(45) Date of Patent: Jan. 12, 2010

(54) WEB SCRAPE TEMPLATE GENERATION

(75) Inventor: Jonathan Monsarrat, Cambridge, MA (US)

(73) Assignee: Stragent, LLC, Longview, TX (US)

( * ) Notice: Subject to any disclaimer, the term of this patent is extended or adjusted under 35 U.S.C. 154(b) by 0 days.

(21) Appl. No.: 11/521,072

(22) Filed: Sep. 14, 2006

(65) Prior Publication Data

US 2008/0071829 A1    Mar. 20, 2008

(51) Int. Cl.
    G06F 7/00      (2006.01)
    G06F 17/00     (2006.01)
    G06F 17/20     (2006.01)
    G06F 17/21     (2006.01)
    G06F 17/22     (2006.01)
    G06F 17/24     (2006.01)
    G06F 17/25     (2006.01)
    G06F 17/26     (2006.01)
    G06F 17/27     (2006.01)
    G06F 17/28     (2006.01)
(52) U.S. Cl. ................ 707/104.1; 715/205; 715/234
(58) Field of Classification Search ................ None
    See application file for complete search history.

(56) References Cited

U.S. PATENT DOCUMENTS

| 6,209,100 | B1 * | 3/2001  | Robertson et al. ............ 726/2   |
| 6,263,352 | B1   | 7/2001  | Cohen .......................... 715/206 |
| 6,665,658 | B1   | 12/2003 | DaCosta et al. ............... 707/3  |
| 6,697,825 | B1   | 2/2004  | Underwood et al. ........ 715/207    |
| 6,714,941 | B1   | 3/2004  | Lerman et al. .......... 707/103 R    |
| 6,826,553 | B1   | 11/2004 | DaCosta et al. .............. 707/1   |
| 6,873,968 | B2 * | 3/2005  | Ehrlich et al. ................ 705/26 |
| 6,892,186 | B1 * | 5/2005  | Preist                                |
| 6,920,609 | B1   | 7/2005  | Manber et al. ............. 715/205   |
| 7,072,890 | B2   | 7/2006  | Salerno et al. ................ 707/5 |
| 7,082,426 | B2 * | 7/2006  | Musgrove et al. ............ 707/3    |
| 7,240,067 | B2   | 7/2007  | Timmons .................... 707/101  |
| 2002/0038255 | A1 * | 3/2002 | Tarvydas et al. ............. 705/26  |
| 2002/0103858 | A1   | 8/2002 | Bracewell et al. .......... 709/203  |
| 2005/0108634 | A1   | 5/2005 | Sahota et al. .............. 715/513  |
| 2005/0192948 | A1   | 9/2005 | Miller et al. ................. 707/3 |
| 2006/0026067 | A1 * | 2/2006 | Nicholas et al. ............. 705/14 |
| 2006/0047724 | A1   | 3/2006 | Messing et al. ............ 707/204  |
| 2006/0287989 | A1   | 12/2006 | Glance ..................... 707/3   |
| 2008/0071819 | A1   | 3/2008 | Monsarrat ................. 707/102  |
| 2008/0162275 | A1   | 7/2008 | Logan et al. ................ 705/12 |

OTHER PUBLICATIONS http://netcopyrightlaw.com/kellyvarribasoft.asp, HTML, latest date 2004, NetCopyRightLaw.com, Box 1.*
momfy et. al. , What Does This Say? : Reviews , http://www.amazon.com/exec/obidos/tg/detail/-/0345470303#RCSKRHYJ229ZK, HTML, 1999-2002, pp. 4, 5, 9.*
Bidder's Edge: Bidder's Edge Offers Online Shoppers the Best of eBay and Auction Universe; Auction Enthusiasts Can Now Find the Best Deals on Beanie Babies and Furbies Over the Internet, 1998, Business Wire.*

(Continued)

*Primary Examiner*—Pierre M Vital
*Assistant Examiner*—Jason Liao

(57) ABSTRACT

A system for automatically locating and data-typing information originating from many Web pages, and then collecting that information in a database. The database is then made available via an online data marketplace which allows users from different organizations to buy and sell related data, associated advertisements, and access to the communities of end-users who may also view advertisements and make purchases.

24 Claims, 14 Drawing Sheets

OTHER PUBLICATIONS

*EBay, Inc.* v. *Bidder's Edge, Inc.* : Order Granting Preliminary Injunction, May 24, 2000, General features of Bidder's Edge.*

Berners-Lee, Hypertext Markup Language—2.0, Network Working Group, RFC 1866, 1-75.*

Office Action Summary from U.S. Appl. No. 11/521,585 which was mailed on Aug. 20, 2008.

Biskup et al., "Extracting information from heterogeneous information sources using ontologically specified target views," Information Systems 28 (2003) 169-212.

Gazen et al., "AutoFeed: An Unsupervised Learning System for Generating Webfeeds," KCAP' 05, Oct. 2-5, 2005, Banff, Alberta, Canada, Copyright 2005 ACM.

Maron, "Screen Scraping with Finite State Machines Project for Programming Techniques," Evolutionary and Adaptive Systems, University of Sussex, Dec. 27, 2003.

Final Office Action Summary from U.S. Appl. No. 11/521,585 mailed on May 4, 2009.

* cited by examiner

Data Schema for Arts & Entertainment Event Listings 200

Venue 201

| Field | Type | Req'd? | Description |
|---|---|---|---|
| ID | Venue ID | Y | |
| Name | string | Y | Venue name |
| Hours | Hours ID [ ] | N | Hours of operation |
| Organizer | Organizer ID | N | The owner for this venue. Only one is allowed. |
| Address | Address | Y | Where people go to attend an activity at this venue |

Activity 202

| Field | Type | Req'd? | Description |
|---|---|---|---|
| ID | Event ID | Y | |
| Name | string | Y | The name of this activity |
| Hours | Hours ID [ ] | N | |
| ShortDesc | string | N | A short description of the activity. |
| LongDesc | string | N | A long description of the activity. |
| Performers | Performer ID [ ] | N | |
| Venue | Venue ID | Y | |
| Organizers | Organizer ID [ ] | N | |
| ChildEvent | Activity ID [ ] | N | A festival activity may have sub-activities |

Organizer 203

| Field | Type | Req'd? | Description |
|---|---|---|---|
| ID | Organizer ID | Y | |
| Name | string | Y | Organization name |
| Contacts | Contact ID [ ] | N | People in this group who can be contacted |

Contact 204

| Field | Type | Req'd? |
|---|---|---|
| ID | Contact ID | Y |
| Name | string | Y |
| Title | string | N |
| Purpose | string | N |
| Email | Email | N |
| Phone | Phone | N |
| Address | Address | N |

FIG. 2

400 Template: A Copy of Web Page With Data Marked Up, in HTML Format

```
[START OF HTML OMITTED]
        <table align="right" border="0" cellpadding="0" cellspacing="0" width="95%">
        <tbody><tr>
         <td width="500">
          <p><font face="Arial, Helvetica, sans-serif" size="1"><br>
          <table border="0" cellpadding="5" cellspacing="0" width="100%">
          <tbody><tr>
           <td valign="top"> <table align="left" border="0" cellpadding="3"
cellspacing="2" width="97%">
            <tbody><tr>
            <td> <div align="left"><font face="Arial, Helvetica, sans-serif"
size="2"><b><font color="#003366"><activity-central type="string" nameof="ac-tag-18"
id="ac-tag-201">
             World of Wheels</activity-central>
             </font></b><br>
             <font color="#ffffff">
             Public
             </font></font> </div></td>
           </tr>
           <tr>
            <td valign="top"> <div align="left"><font color="#ffffff" face="Arial,
Helvetica, sans-serif" size="2"><activity-central type="string" hoursof="ac-tag-18" id="ac-
tag-298">

January
             6
             -

January
             8</activity-central>
             </font> </div></td>
           </tr>
           <tr>
            <td valign="top"> <div align="left"><font color="#ffffff" face="Arial,
Helvetica, sans-serif" size="2"><activity-central type="Organizer" organizerlistof="ac-tag-
18" id="ac-tag-425">
             Championship Auto Shows</activity-central>
             </font> </div></td>
           </tr>
[END OF HTML OMITTED]
```

FIG. 4

600 Many Locations Exist on the Data Web Page

```
[START OF HTML OMITTED]
        <table align="left" cellspacing="2" width="97%">         ─ 1
  2 ──── <tbody><tr>──────── 3
            <td> <div align="left">  ─ 5
  4 ──── <font face="Arial, Helvetica, sans-serif" size="2">  ─ 6
          <b><font color="#003366">
              Boston Home Show ──────── 8
  7 ─────                          9
[END OF HTML OMITTED]
```

601 Contextual Clues Helping Specify a Location

| Daily Web Scraping 103 Finding Data on A Page |
|---|
| Location (Number of ASCII characters from document start) & Depth (nesting factor of HTML tags) |
| Long stretch of text or short stretch |
| Relation to unique marker, anchor text such as "Price" that never changes |
| Tags such as <table>, but there may be more than one <table> in the document with the same attributes |
| Relation to information already located on the page |

602 Adjacency Relationships In-Between Neighboring Elements

| Daily Web Scraping 103 Finding Data on A Page |
|---|
| Go forwards, backwards one tag in the HTML document |
| Go up or down in the HTML hierarchy of tags |
| Go straight ahead for 1,000 characters |
| Find the <table> tag that is closest to 1,000 characters from the current location |
| Skip three <table> tags and select the fourth |

FIG. 6

```
[START OF HTML OMITTED]

<table border="0" cellpadding="5" cellspacing="0" width="100%">
        <tbody> <tr>
        <td valign="top">  <table align="left" border="0" cellpadding="3" cellspacing="2" width="97%">
            <tbody><tr>
            <td>   <div align="left"><font face="Arial, Helvetica, sans-serif" size="2"><b><font color="#003366">
                Boston Home Show
                </font></b><br>
                <font color="#ffffff">
                Public
                </font></font> </div></td>
            </tr>
            <tr>
            <td valign="top">  <div align="left"><font color="#ffffff" face="Arial, Helvetica, sans-serif" size="2">

January
                13

January
                15
                </font> </div></td>
            </tr>
            <tr>
            <td valign="top">  <div align="left"><font color="#ffffff" face="Arial, Helvetica, sans-serif" size="2">
                Pat Hoey Productions
                </font> </div></td>
            </tr>
[END OF HTML OMITTED]
```

FIG. 9

WEB SCRAPE TEMPLATE GENERATION

BACKGROUND OF THE INVENTION

The World Wide Web contains billions of pages of freely available information, such as airplane arrival times, baseball statistics, and product descriptions. However, much of that information is embedded in running prose intended for reading by humans. A human is best equipped, for example, for locating the information on a Web page, giving it a data type (whether "1938" is a calendar year, the price of a product, or an airline flight number), and relating it to other data ("this picture located here depicts that product located there"). This manual process is time-intensive and error-prone.

There are current two ways to extract data automatically from a Web page, a process which is called "Web scraping". First, every Web page contains hidden mark-ups for formatting, such as boldface and italics. Theoretically, these markups can help a computer algorithm locate information on a page. Unfortunately, every Web site has a different look and feel, so each Web page needs its own custom algorithm. Writing a custom algorithm is time-intensive, but possible on a small scale, such as a price comparison website which gathers product information from a dozen sources. But there is no efficient way to scale this approach up to thousands or millions of Web sites, which would require thousands or millions of custom algorithms to be written.

The second method requires the owner and developer of each Web site to add hidden mark-ups that specifically designate information and its data type. The preferred technology for this is XML. Unfortunately, nearly all Web sites are not built this way, and there are no standardized terms for XML usage. It is a little like saying that if only everyone would speak Esperanto, there would be no translation problems. This is true in theory, but hopelessly impractical.

Once data has been collected, there are no good mechanisms for disseminating it. Every Web site that publishes information stands alone. Each publisher writes its own content, sells its own ads, and manages its own online community. Web publishers such as Amazon.com that include others' book reviews, and such as The Boston Globe that include others' newswire stories, require their partner's active participation to integrate their databases together. This function is also quite difficult to scale up to millions of potential partners and the trillions of possible bilateral partnerships between those potential partners. The matter becomes even more complicated when advertisements, which can come from thousands of sources, need to be associated with data and presented to the end-users who read the publisher's Web site. Finally, there is currently no easy way for the online communities of various Web sites to profit from each other's knowledge, forming a "meta-community" which could, for example, automatically share movie reviews and ratings across thousands of movie fan Web communities.

SUMMARY OF THE INVENTION

There exists a need for a low-cost, highly-automated method for "scraping" information from the World Wide Web, forming partnerships to trade this data, and presenting it to readers alongside advertisements from any source.

Briefly, the present invention provides a system for automatically locating and data-typing information from thousands of Web pages, and then collecting that information in a central database. The database is then made available via an online data marketplace which allows users from thousands of different organizations to buy and sell related data, associated advertisements, and access to the communities of end-users who may also view advertisements and make purchases. These innovations may be used together or separately.

Web pages contain running text, in English or some other language, which is designed to be read by humans. Thus, extracting the data embedded in that text, data type information and context would seem to be a difficult problem for a computer algorithm. However, some automation is possible because many Web pages can be grouped as similar in appearance and format. For example, every book description Web page on Amazon.com looks the same as every other. If a human locates and types information on one Amazon.com Web page, then a computer may be able to locate and type data on all of the millions of similar-looking Web pages on Amazon.com. The challenges are then (a) what is the best user interface for a human to identify for a computer which element of a Web page contains the desired information, and the information's data type and relation to other data?

(b) What is the most flexible way to store and communicate this knowledge?

(c) How can a computer generalize from one Web page to extracing information from millions of similar looking Web pages, even if they do not a match precisely?

(d) In what ways can the need for human involvement be minimized, and probable errors be identified automatically for review?

(e) What is the best user interface to report errors to a human and have them step in to fix the situation?

(f) What modifications are required to target specific vertical markets?

These problems are solved with a method according to a preferred embodiment of the invention in the following way:

(a) Using the mouse and a Web browser, a human interacts with a program (such as running on an application server) and highlights information on a page and right-clicks to bring up a dynamically-generated menu to permit the user to select the data type.

(b) Information as to data type is then stored directly into a copy of the Web page by the server.

(c) Web pages typically include not only prose but also text formatting markup tags (such as <b> that cause text to be displayed in boldface). The server can match an element on a template to an element on a source Web page to another by defining a set of "contextual clues" that characterize an element's location in the context of its Web page. Then the server makes a map of these features, which can be used later to navigate around the Web page.

(d) Natural language algorithms using word frequency statistics can also be used to characterize extracted data, and thus provide suggestions to the human user for rapid information location and data typing. These word frequency statistics can also be used to evaluate the result of automated extraction for likely correctness.

(e) An interface similar to the debuggers used for computer programming languages can be used to report the results of data typing.

(f) For specific vertical markets, the data may be extracted as lines of text that require further processing (e.g. extracting the time-of-day from a text string such as "Hours of Operation: Monday to Friday, 8am to 5pm, except Holidays"). Specially written parsing algorithms can be used, because the vocabulary in such a domain is limited (e.g., to determining time-of-day ranges).

Once data has been collected, a further mechanism can be employed so that the data can be freely traded and published.

A database suitable for storing information scraped from Web sites, in one emobidment, differs from standard databases in several ways:

(a) the Web page that is the source for the data may change regularly, requiring a moderator to configure an information flow rather than store static data 1006

(b) data may be sourced from numerous Web pages, which should be assembled 506;

(c) users of the database, e.g., a publisher of a Web site, may have a community that will contribute numeric ratings, and prose commentary and the like to the data 1004; managing this centrally so that the opinions of differing communities can be shared is another desirable feature 1006;

(d) publishers of Web information may often want to associate advertisements with the data, in as targeted a way as possible, to achieve the highest level of accuracy. Targeting advertisements towards information scraped from Web sites may require special algorithms 1010; and finally (e) Web scraping algorithms may occasionally gather the wrong information, requiring a technique to automatically identify and reject this information 507.

BRIEF DESCRIPTION OF THE DRAWINGS

The foregoing and other features, and advantages of the invention will be apparent from the following more particular description of preferred embodiments of the invention, as illustrated in the accompanying drawings in which like reference characters refer to the same parts throughout the different views.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 illustrates a data schema that defines data typing and data inter-Relationships.

FIG. 4 illustrates a Web page that has been set up with marks.

FIG. 6 illustrates example contextual clues and navigational steps to provide clues for navigating through a Web page.

FIG. 9 illustrates an example page where the locations of elements containing the desired information have been identified.

DETAILED DESCRIPTION OF THE INVENTION

A description of preferred embodiments of the invention follows.

Overview

This preferred embodiment is in the arts & entertainment industry. Arts and entertainment events are typically listed across thousands of Web sites. Gathering, trading, and publishing this information is of substantial value to Web Publishers 111, Advertisers 108, and the Online Community 112 for each of the published Web sites.

Figure 1:
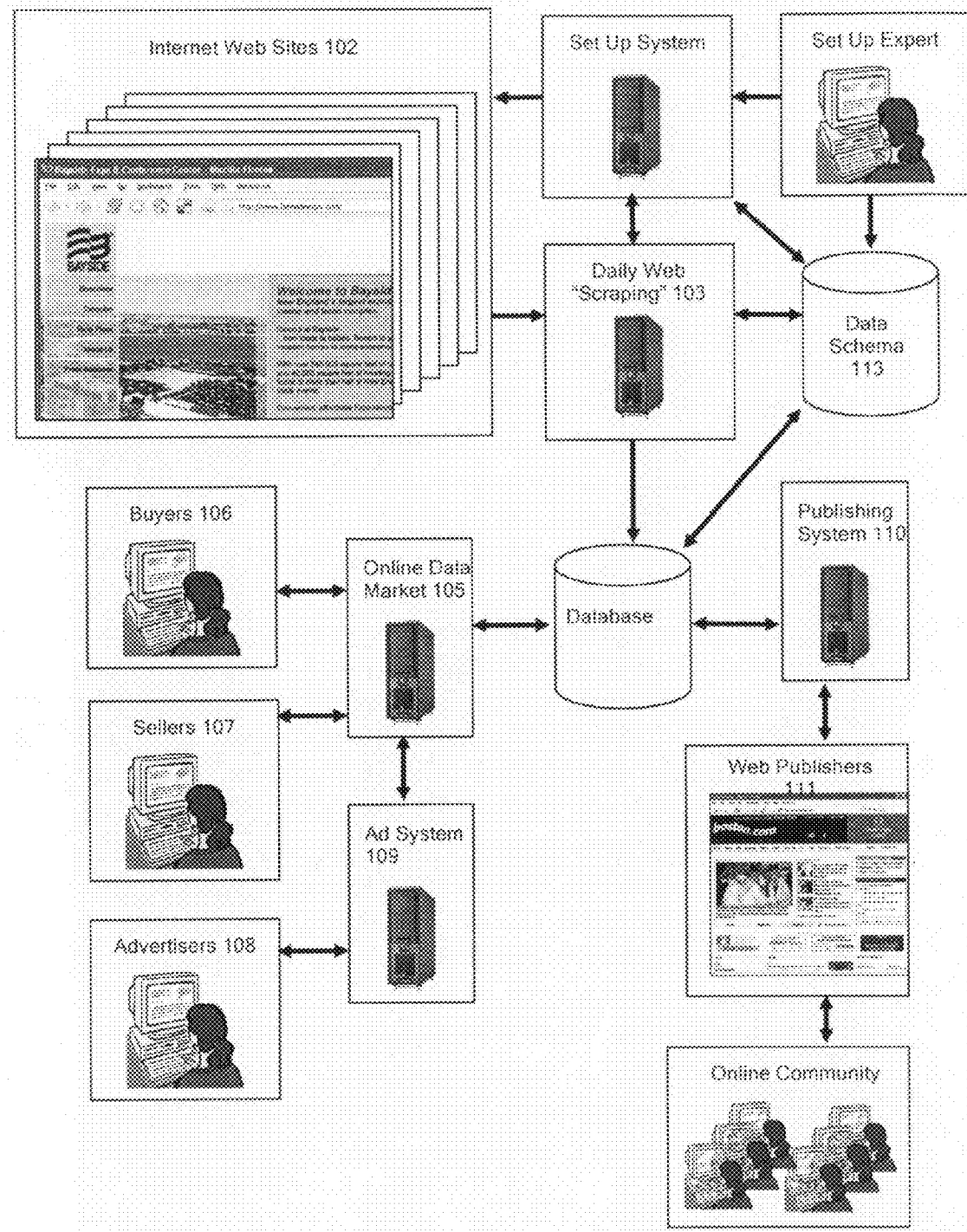
FIG. 1 is a high level diagram of a data processing environment in which the invention may be implemented.

FIG. 1 shows an overview of a data processing environment in which the invention may be used. First, the Set Up Expert 100 characterizes the data domain of the data to be gathered from the Web, using a Data Schema 113. For example, if the data domain is automobiles then the Data Schema 113 would specify that cars have a make, model, and year of manufacture. Having built the Data Schema 113, the Set Up Expert 100 uses the Set Up System 101 to browse to a Web page and mark the location of information, creating a template. This may be repeated across thousands of Web sites, but one template will usually suffice for a single page, and an entire group of Web pages that have similar look and feel, for all time throughout their changes and updates. A Web server then uses this configuration for Daily Web "Scraping" 103, a term which means reading source Web pages and extracting information using the appropriate template.

The extracted information is stored in a Database 104. This Database 104 feeds data into a Publishing System 110 which can be used by each of several Web Publishers 111 to provide information to their own Online Community 112, of which there is one for every Web publisher. The Database 104 is itself fed by an Online Data Market 105, which allows Buyers 106 and Sellers 107 to freely trade primary and auxiliary information relating to data flows that come from Web site, effectively creating a meta-community from potentially thousands of different online communities. An Ad System 109 allows Advertisers 108 to register advertisements with the system, which are matched with information in the Online Data Market 105. This matching presents advertisements to the Online Community 112 that are relevant to their interests and thus more likely to stimulate Advertisers 108 to spend money.

Setting Up a Web Page to be "Scraped"

Because the data domain is Arts and Entertainment event listings, the Set Up Expert 100 characterizes this data domain by creating a Data Schema 113. A typical way to do this would be using the database language SQL, or as class definitions in Java. FIG. 2 shows an example Data Schema 113, the Data Schema for Arts & Entertainment Event Listings 200, which defines for each data class, its data type, and its data inter-relationships. For example, each Activity 202 has a Venue 201 and an Organizer 203. Every Venue 201 has an address. Error-checking information is included in the schema. For example, addresses should not be more than 50 words in length. This error-checking information can be manually set up or computed using statistics from known examples.

Figure 3A:
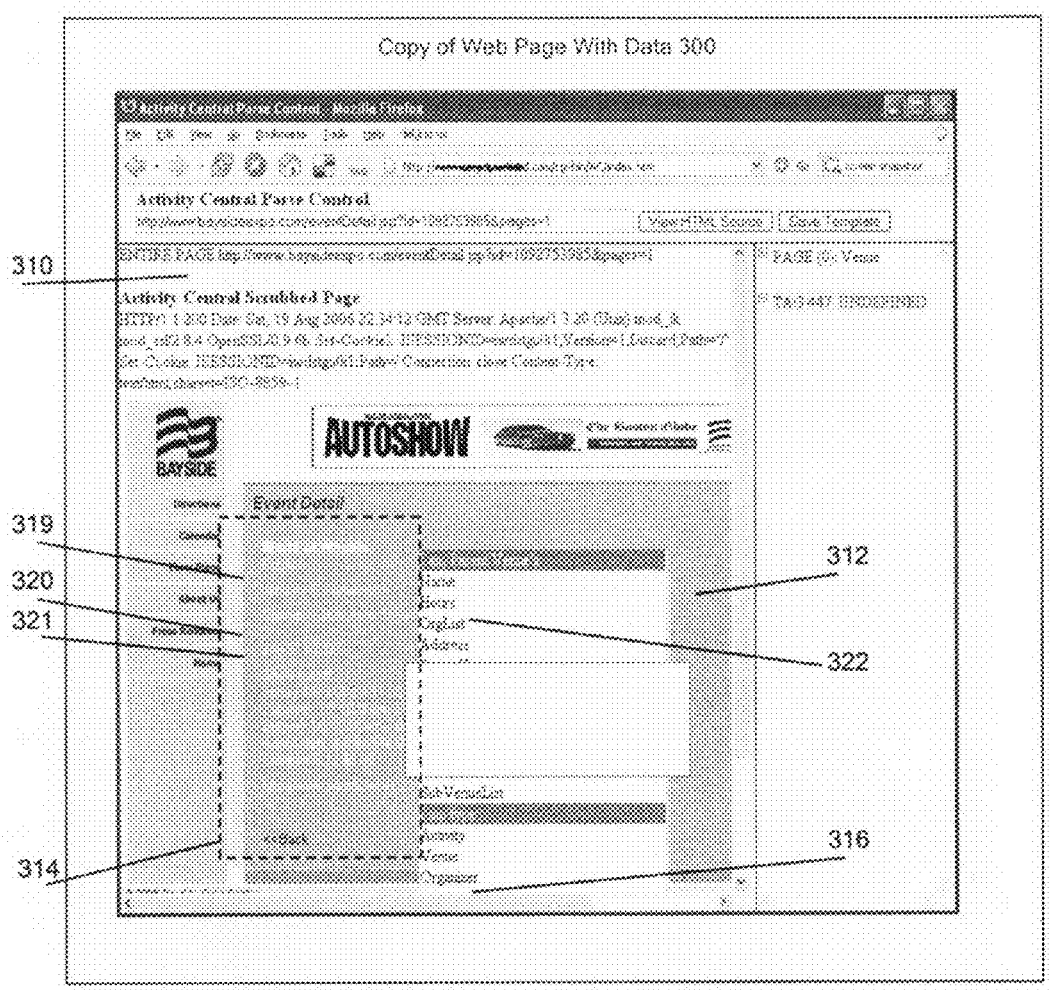
FIG. 3a is a copy of a Web page with data.
Figure 3B:
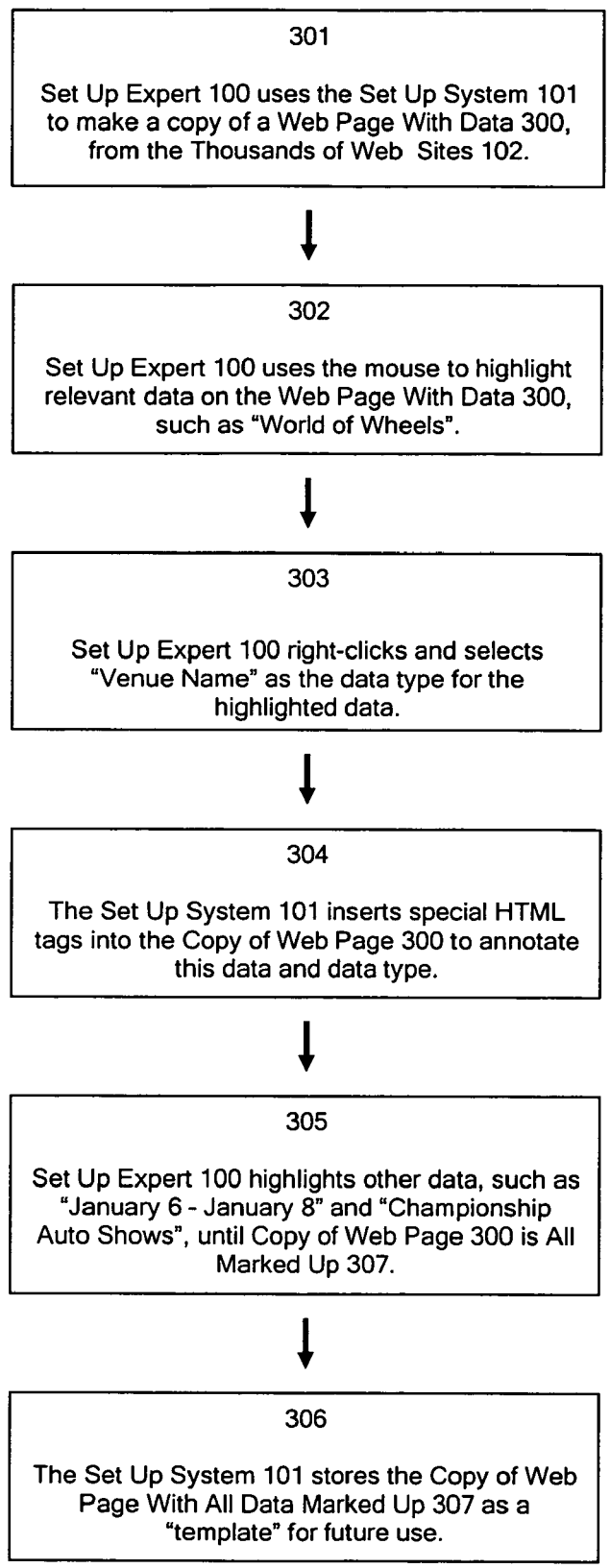
FIG. 3b is a sequence of steps for setting up a Web page to be "scraped".
Figure 3C:
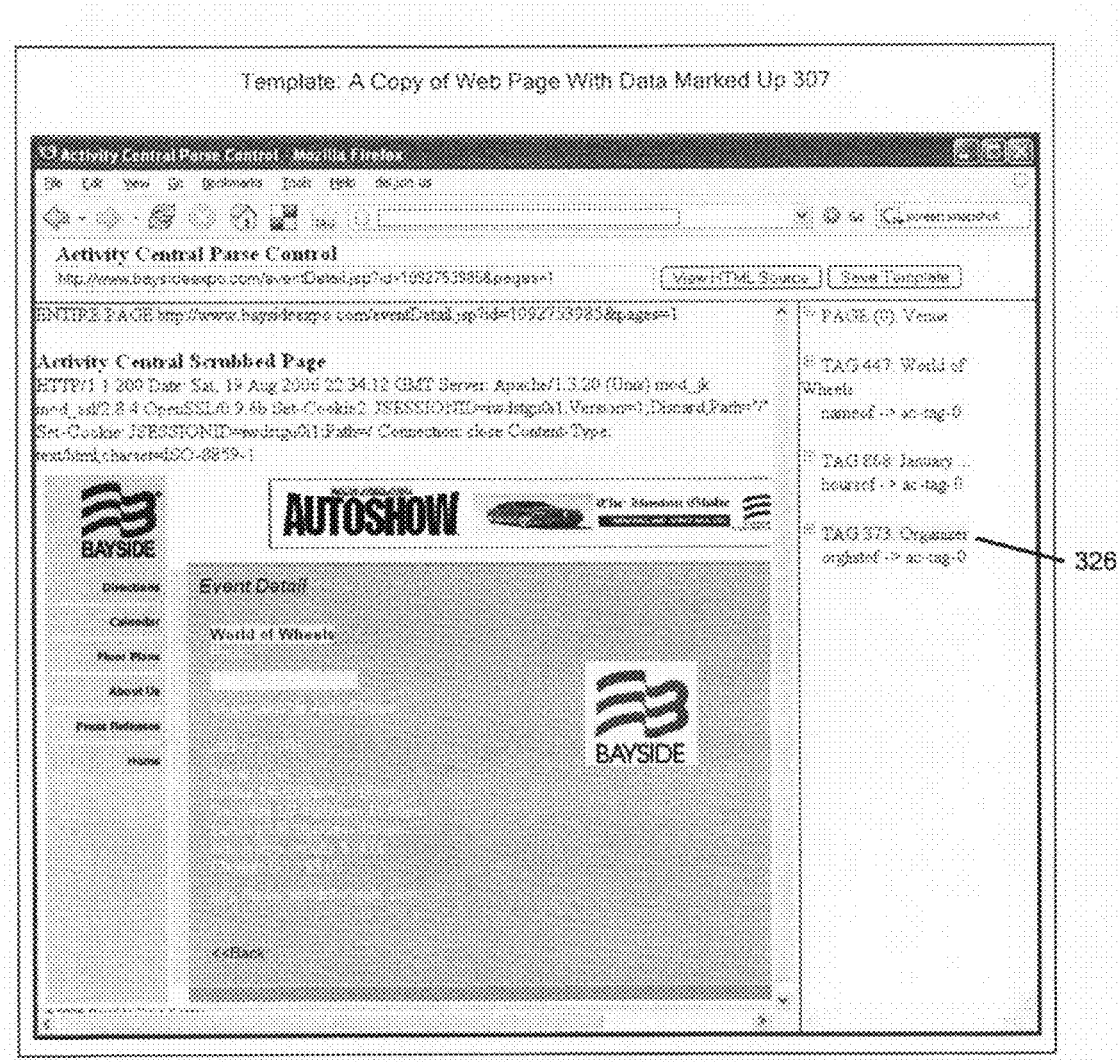
FIG. 3c is a template: a copy of Web page with data marked up.

FIGS. 3a, 3b and 3c illustrate the manual set up that is required to gather information from a Web site. First the Set Up Expert 100 identifies target Web sites that are relevant to the data domain. In this preferred embodiment, the data domain is Arts and Entertainment events, so the Set Up Expert 100 would target museum, concert hall, student club, festival organizer, and similar Web sites. Such sites may contain event calendars with relevant information embedded within. Once a few target Web sites have been identified, a statistical algorithm can identify others on the Internet through word-frequency and word-location matching. The end result is a group of target Web sites from which information can be drawn. For example, in New England, there are 3,000 Web sites that list activities and events. These Web sites, which change day-to-day, list 100,000 New England activities and events each month.

Each Web site can have dozens, thousands, or potentially millions of Web pages. Each Web page with a unique look and feel requires a template to be manually set up. However, most Web pages belong to a group of similar-looking Web pages. A group like this requires only one representative Web page to be manually set up as a template. In this example, the Set Up Expert 100 identifies the Bayside Expo Center as a major venue for conferences in the Boston, Mass. area. The Bayside Expo Center has a website at a well known .com address. One Web page on that website is a calendar of activities happening at the Bayside Expo Center.

In step 301, The Set Up Expert 100 directs the Set Up System 101 to make a copy of the calendar of events of the Bayside Expo Center, resulting in a Copy of Web Page With Data 300. The Copy of Web Page With Data 300 is simply a copy of the Hyper Text Markup Language (HTML) of the original Web page.

In this example, The Copy of Web Page With Data 300 contains information about the event, including its name, "The World of Wheels" 319, its time span, "January 6-January 8" 320, and its organizer, "Championship Auto Shows" 321. We also know that the event takes place at the Venue for this website, The Bayside Expo Center. The Set Up Expert 100 wants to teach the system how to automatically scrape this information from the page and all other Web pages in the group of similar-looking pages, which comprise the entire calendar of the Bayside Expo Center.

In step 301, The Copy of Web Page With Data 300 is displayed in a Web browser on which is running a Java applet. As shown in FIG. 3a, Set Up Expert 100 uses the mouse to highlight items on the page. First, the user assigns a type to the entire page, by highlight the "entire page" element 310 at the top of the page and right-clicking with the mouse. A dynamically generated drop-down menu 312 appears listing the data types in the Schema 200. The user selects Venue 201 from the list, because this Web site is owned by The Bayside Expo Center, which is a venue. Then the user highlights the entire Activity 314, and right-clicks with the mouse.

This time the drop-down menu 312, which is dynamically generated, makes some guesses about the data type that is most appropriate for the element that was just highlighted. Since the page itself is a Venue 201, and the Data Schema for Arts & Entertainment Event Listings 200 says that every Activity 202 has a Venue 201, one of the elements of the drop-down menu will be Activity 316, which the user selects. In this way the dynamically generated drop-down menu 312 is making it simpler and faster for the user to identify data types, by automatically suggesting what seems most relevant. Word frequency statistics can be used in the creation of such suggestions. For example, if the user highlights a 10 digit number with dashes that is most likely a phone number, the drop-down menu would place "Phone Number" at the top of the dynamically generated drop-down menu.

In step 302, the Set Up Expert 100 highlights "World of Wheels" 319. Then in step 303, the user right-clicks, again bringing up a dynamic drop-down menu. According to the Data Schema for Arts and Entertainment Event Listings 200, each Activity 202 is associated with a name, hours of operation, organizers, and other data. These possibilities are listed in the dynamically created drop-down menu, and the user selects "name" 322. Then in step 304, the computer then places special annotations into the Copy of Web Page With Data 300 to record these facts.

Similarly, in step 305, the Set Up Expert 100 associates "January 6-January 8" 320 as the time span for the event, and "Championship Auto Shows" 321 as an organizer 326 (see FIG. 3c). This information is displayed in The Copy of Web Page With All Data Marked Up 207. When the user is finished, in step 306, the Set Up System 101 stores the Copy of Web Page With Data 300 as a template for future use. This template contains:

The original Web page's HTML in full
Annotations showing:
    The location of the element on the Web page that contains the desired information
    The data type of the information
    The relation between this information and other data on this page or elsewhere The drop-down menu 312 includes the item "anchor", which allows the user to indicate that the highlighted text on the Web page should never change. This annotation would also be stored as an embedded tag in The Copy of Web Page With Data 300.

The drop-down menu 312 also includes the item "link", which allows the user to indicate that a link on the Web page is important. Any link the user clicks on is automatically read as important, as well. The intention is that during the Web scraping phase, if a Web page being read contains a link, the Web page being linked to will also be scraped, using the appropriate template.

Finally, the user may also indicate that some text region of the Web page is a list of blocks, and each block is treated as if it were a separate Web page with its own template. For example, the calendar of events at the Bayside Expo Center is one big list of identically formatted event summaries, each of which links through to an identically formatted event details page. A template from one of the event detail pages will thus suffice to read information from the rest.

FIG. 4 shows the resulting embedded markups in the Template: A Copy of Web Page With Data Marked Up, in HTML Format 400. The special annotations created by the Set Up System 101 are highlighted. There is no difference between this and the Template: A Copy of Web Page With Data Marked Up 307. It is the same HTML page displayed differently—first in a Web browser and then in raw text format.

"Web Scraping": Gathering Data from Web Sites

Figure 5A:
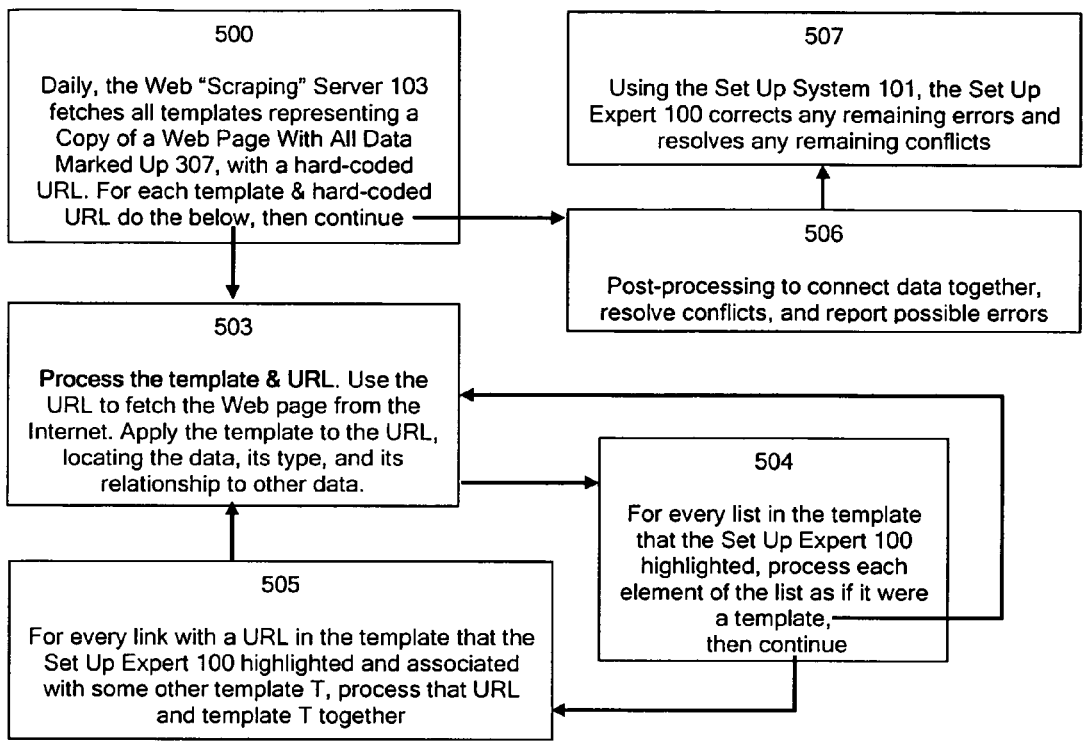
FIG. 5a illustrates a sequence of steps for "Web scraping": gathering data from Web Sites.

Once the Set Up Expert 100 has marked up several or possibly thousands of Web sites, FIG. 5a illustrates how data is gathered.

Web scraping is run as a batch job on Daily Web Scraping 103 that can be repeated monthly, daily, hourly, or more frequently. Different data domains will tend to change more or less frequently, requiring more or less frequent Web scraping. An event calendar, for example, may be updated daily, but a Web page with stock market fluctuations may change every minute.

The starting point in Step 500 is to gather all the templates from the Database 104 that are associated with a permanent URL. A permanent URL, for example, would be the home page of the Bayside Expo Center events calendar, which resides at a known URL and will never be located elsewhere.

Other templates, those without a permanent URL, are accessed through the user-identified links on Web pages already being processed.

Then in Step 501, all the templates with permanent URLs are sent for processing, Step 502. The first step in processing, Step 503, is to use the URL to fetch a source Web page in real-time from the Internet. This source page is fully up-to-date with whatever information the Web publisher owning that Web page has got currently posted on their website. Then the server applies the template to the source Web page, matching the elements of the template to the elements of the Web page, and extracting the desired information, its data type, and its inter-relationship to other data. Exactly how this is done is described in the next section. For example, the Bayside Expo Center events page would be loaded and compared with the appropriate template. The big list of events would be discovered.

Figure 5B:
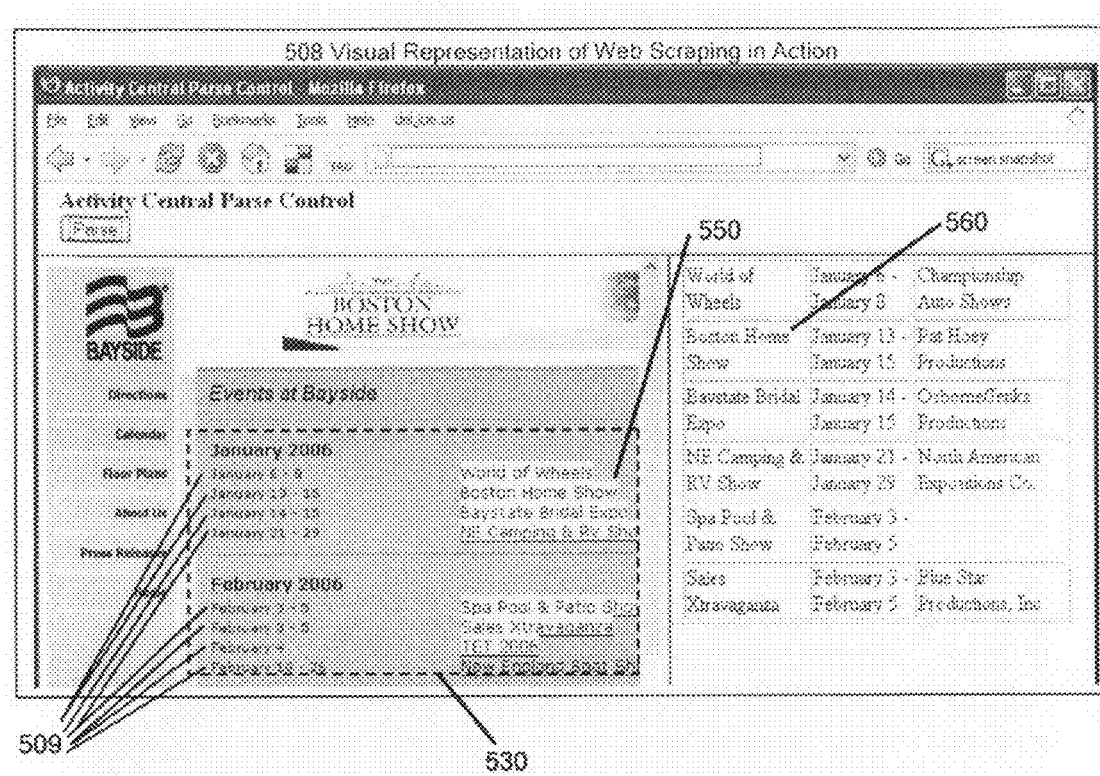
FIG. 5b is a visual representation of Web scraping in action.

Then in Step 504, if the source Web page contains any lists, those lists are now processed. For example, a list 530 was found on the event calendar page of the Bayside Expo Center in FIG. 5b. A list is a series of blocks 509, each on one line, each of which is processed against a template just as Web pages are processed against templates in 503. In this case, the Bayside Expo Center has a series of brief event descriptions which link into pages with detailed descriptions, such as the "World of Wheels" page shown in 300. Each of these brief event descriptions is scraped for information.

The last step in processing a template against a URL is Step 505, to handle any links that were discovered in the list. Each of the blocks 509 on the Bayside Expo Center event calendar list has a link, as noted in the previous paragraph. Each link is associated with the template for scraping the Web page that is linked to. As one example, there is a link 550 to the "Boston Home Show" event page. The Web Scraper 103 proceeds to load the page linked to, the "World of Wheels" page. The template 307 derived from the "World of Wheels" event page 307 is compared against the "Boston Home Show" event page, a comparison is made, and data is extracted 560. The extracted data is as then stored with their data types (Venue 201, Activity 202, etc.).

To summarize, the entire Web site can be read when the Set Up Expert 100 has only set up two pages, the Bayside Expo Center events calendar page and the World of Wheels event details page. From this rapid manual labor, the Daily Web Scraping 103 can now proceed automatically and read every events page on the entire website, both that day and every day in the future.

Finally, after all the pages and the pages they link to have been read and processed, in Step 506, the data that has been gathered is post-processed to connect data together, resolve conflicts, and report possible errors. Then in Step 507, using the Set Up System 101, the Set Up Expert 100 corrects any remaining errors and resolves any remaining conflicts. The resulting data may resemble A Visual Representation of Web Scraping in Action 508.

How Information is Located on the Web Page

Given a template, such as Template: A Copy of Web Page With Data Marked Up, 307, and a page to read, such as the "Boston Home Show" page on the Bayside Expo Center (see FIG. 9), how can the computer locate and data-type fields such as Title: "Boston Home Show", Hours: "January 13-January 15", Organizer: "Pat Hoey Productions", as shown in A Visual Representation of Web Scraping in Action 508? Since the data-type is embedded in the template 307, the problem can be distilled down to location. Once we have matched every element in the template indicating desired information with the corresponding element in the source Web page, the data typing and data inter-relationships are simply given from the template's element.

FIG. 5 illustrates the contextual clues needed to locate information on a Web page. In Many Locations Exist on the Source Web page 600, there are nine locations identified, all HTML tags, white space, or running text such as "Boston Home Show". The trick is to identify which location on the source Web page ("Boston Home Show") matches up with the highlighted location on the template ("World of Wheels").

Every location has contextual clues, such as which tag surrounds or precedes it, as shown in Contextual Clues Helping Specify a Location 601. In addition, two adjacent locations will have a relationship to each other, as illustrated in Adjacency Relationships In-Between Neighboring Elements 602. This information helps identify matches between elements on the template and elements on the source Web page, even though we cannot rely on the source Web pages associated with a template to have identical formats today and for all time. The text is likely to vary significantly, and the tags and general structure of the source Web page may change slightly too.

Figure 7:
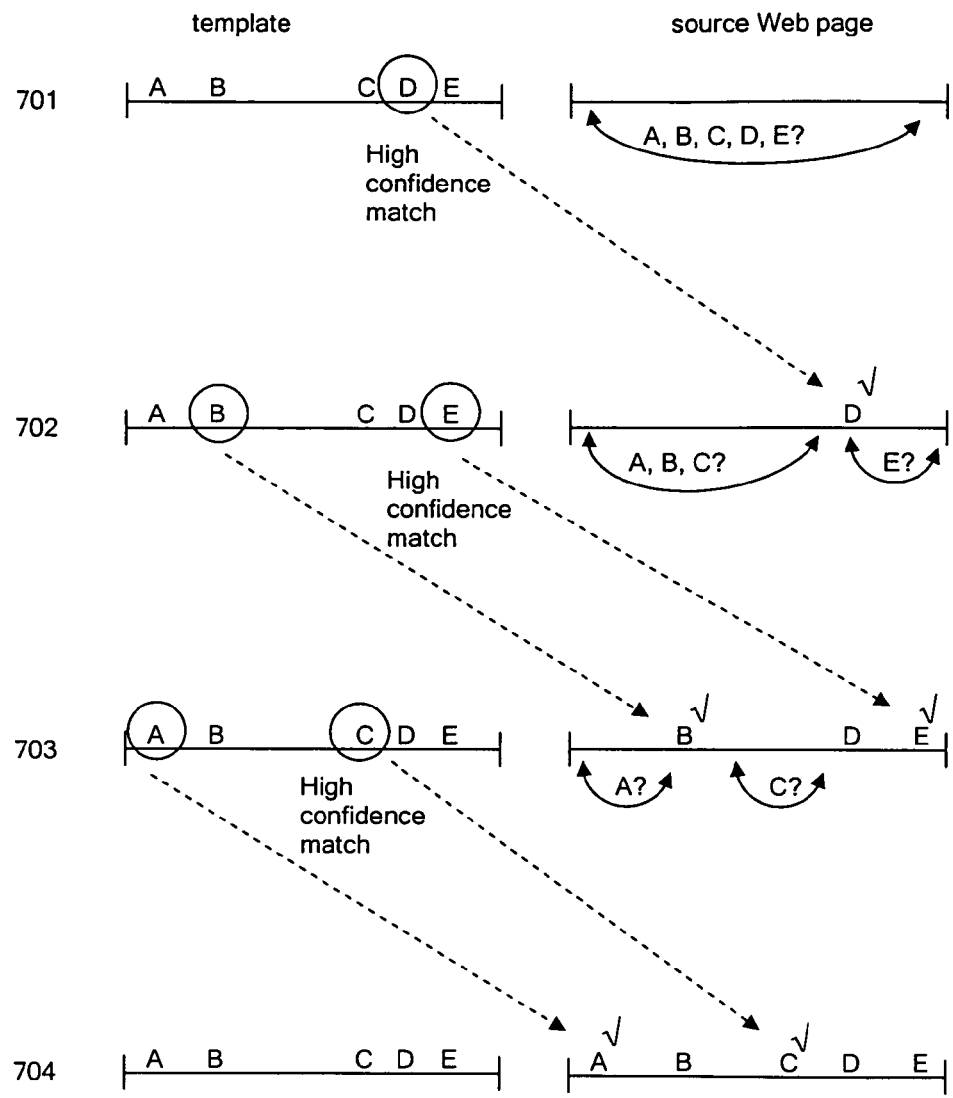
FIG. 7 is a conceptual diagram illustrating how the processes match elements on a template to elements on a source Web page.

FIG. 7 shows the approach to matching up the elements of the template with the corresponding elements of the source Web page. The algorithm for matching locations between a template and a source Web page begins with the matches that are highest confidence, which become "anchors". Those anchors give further contextual clues to place down other locations in-between known anchors.

Figure 8:
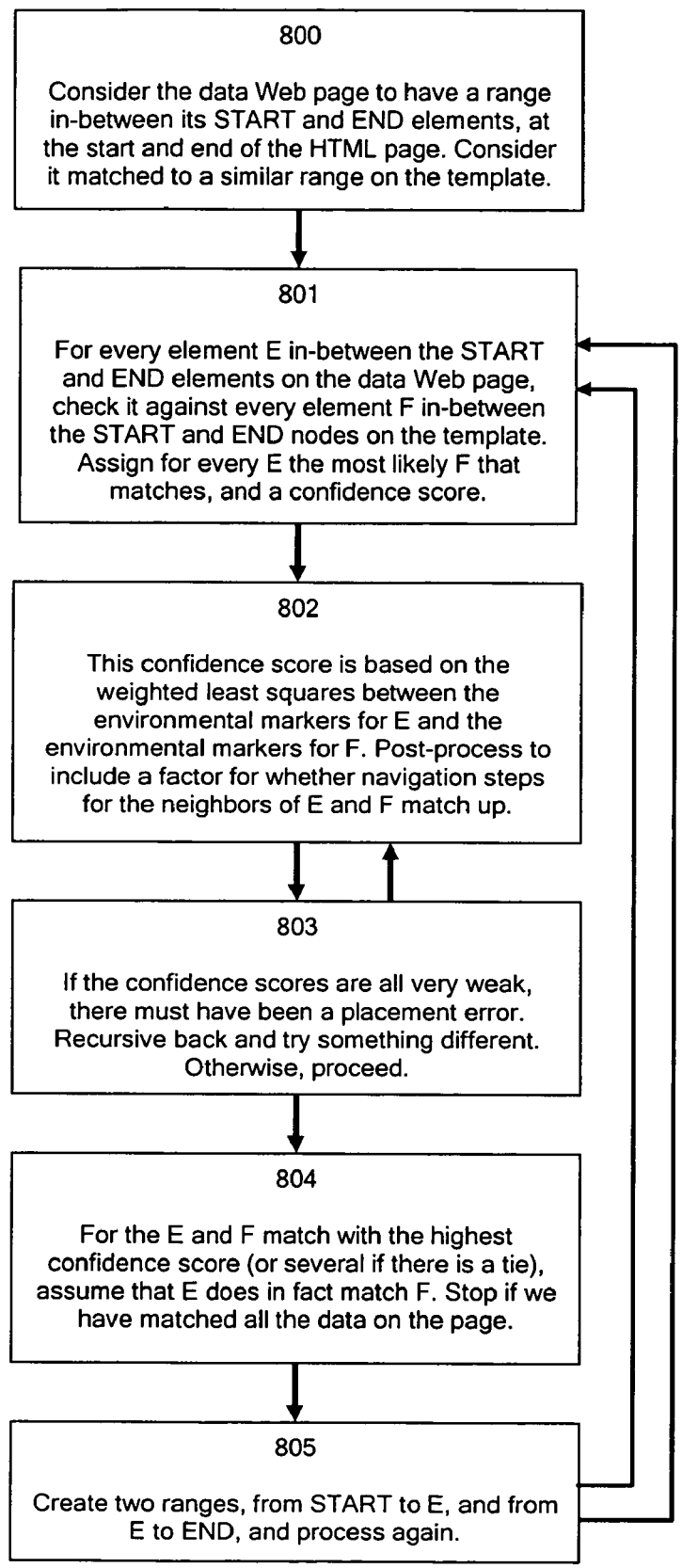
FIG. 8 illlustrates a sequence of steps for how elements are located on the source Web page.

FIG. 8 is a formal description of the algorithm for locating information on a source Web page using a template. In step 800, a range is defined between the start and end points of the two Web pages being matched. In step 801, every known template element F is examined, and every possible location of that element E on the source Web page is examined, to find all the E-and-F match ups in which we have very high confidence. As shown in step 802, this is done using the above described contextual clues and adjacency relationships as a scoring system and using a weighted least squares algorithm. In step 803, if no high-confidence matches are found, the algorithm recursively backtracks and may signal a human for assistance.

In step 804, we choose the highest confidence match is chosen and in step 805 this becomes an anchor point, splitting the START-to-END region into two regions: START-to-ANCHOR, and ANCHOR-to-END. This transforms the problem into smaller regions where all of the neighboring locations to ANCHOR can now be located by returning to step 801.

Although this would seem to be a slow algorithm, since it involves all combinations of E and F, in practice there are typically several unique or very high confidence matches which can be located immediately, dividing the problem into small fragments. One complexity is that since things may be added or deleted from a Web page over time, a separate weighted least squares algorithm evaluates the possibility that one of the elements of the template simply does not exist in the source Web page, or exists but something additional has been added.

Online Market for Data Scraped from Web Sites

Figure 10:
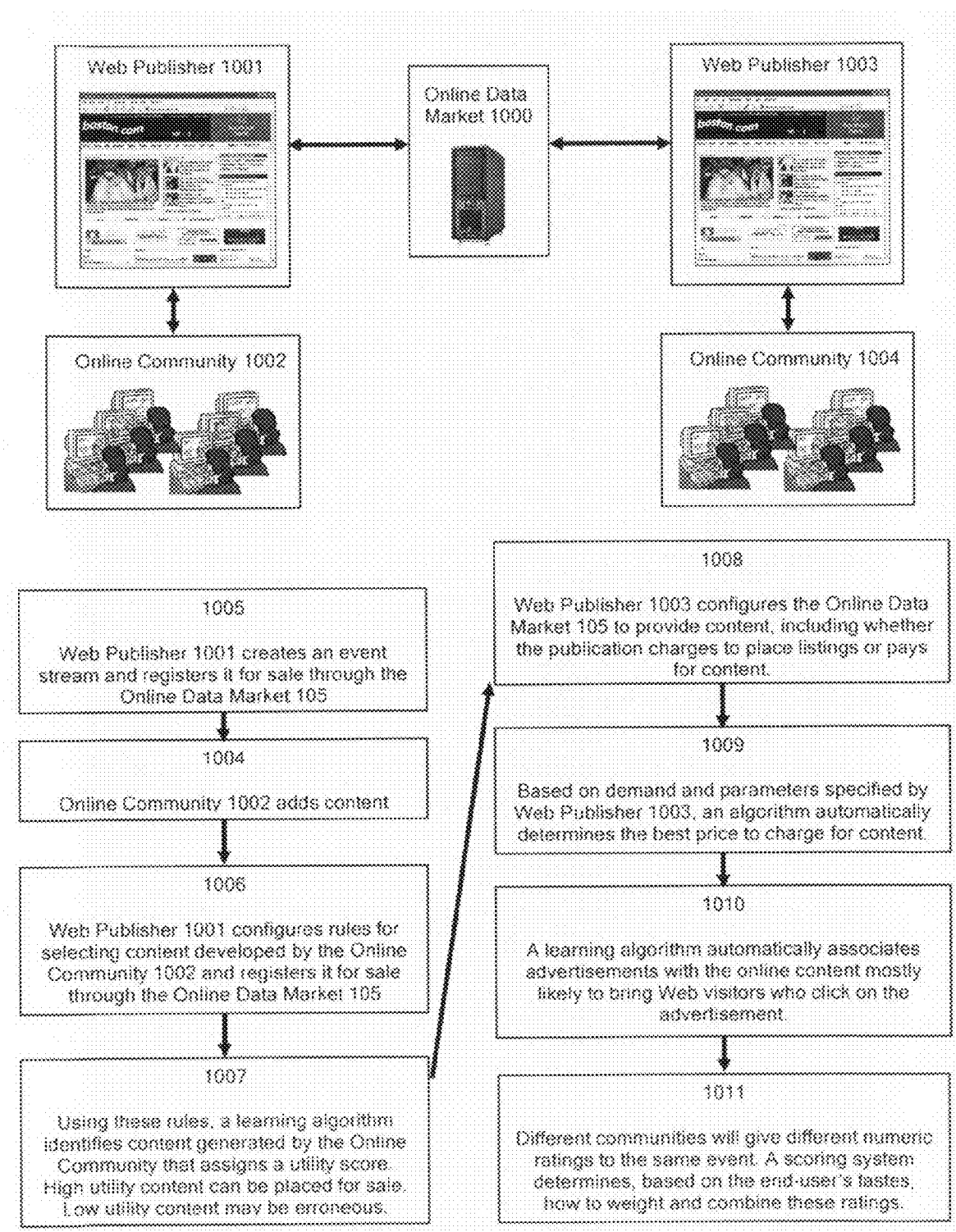
FIG. 10 illustrates an online marketplace for information scraped from Web sites and a "meta-community".

Historically, online marketplaces have been created for buying and selling antiques or trading stock over the Web. However, trading the data scraped from Web sites presents new features. Referring to FIG. 10, Web Publishers 1001 act as brokers for buying and selling information for their respective Online Communities 1002

Not only are Web Publishers 1002 charged monetarily for buying and rewarded monetarily for selling; their Online Communities 1002 may bear costs or reap rewards as well. How best to managing these flows is an issue.

Information generated by Online Communities 1002 should be policed for accidental or malicious error The information that is to be traded is of a form never traded before:

Event experts who sell reviews, photographs

Communities who share their ratings (each community's ratings can be weighted when combined)

Moderators who choose a stream of events, like a DJ chooses which music to play

Access to advertisers and access to communities

Event experts who use category tags to label an event for easy reference

Data scraped from the Web is not static; it is a flow that is frequently changing Finally, Advertisements can be targeted to differing communities based on their differing statistics, increasing the effectiveness of ads and therefore how much advertisers will pay.

What is happening is similar to podcasting. Audio broadcasts have traditionally been expensive and complex to produce, and were dominated by large corporations through radio stations. The Internet made it possible for hobbyists to inexpensively produce their own audio shows, leading to a boom in creativity and content. In a similar way, although online communities have existed for over a decade, for the first time, through the Online Data Market 1000, an entire community can act together to "broadcast" information to other communities. Online communities become lightweight and inexpensively created and managed. This paradigm explicitly includes a commercial buy and sell model, fostering incentives and creating one huge meta-community for any data domain.

In previous sections of this description of a preferred embodiment, a regular daily scraping of thousands of arts & entertainment Web sites has been set up, creating an ever-changing data flow of arts & entertainment activity listings.

Now, in Step 1005, a Web Publisher 1001 configure this stream of activities, choosing which portion of the whole will appear on his or her Web site for his or her Online Community 1002. The first way this can be done is through performing a query to the Database 104 and saving that under a name. This query is then optimized so that updates are selected as new information is added to the Database 104 by the Daily Web Scraping 103. This query may be based on keywords, or on category tags. A category tag is text word such as "Over-18", "Handicapped-Access", or "Free" that can be applied to an event explicitly in an attempt to categorize it. A statistical matching algorithm is used to automatically apply category tags based on the text of a source Web page, starting from a seed of user-applied tags.

Figure 11:
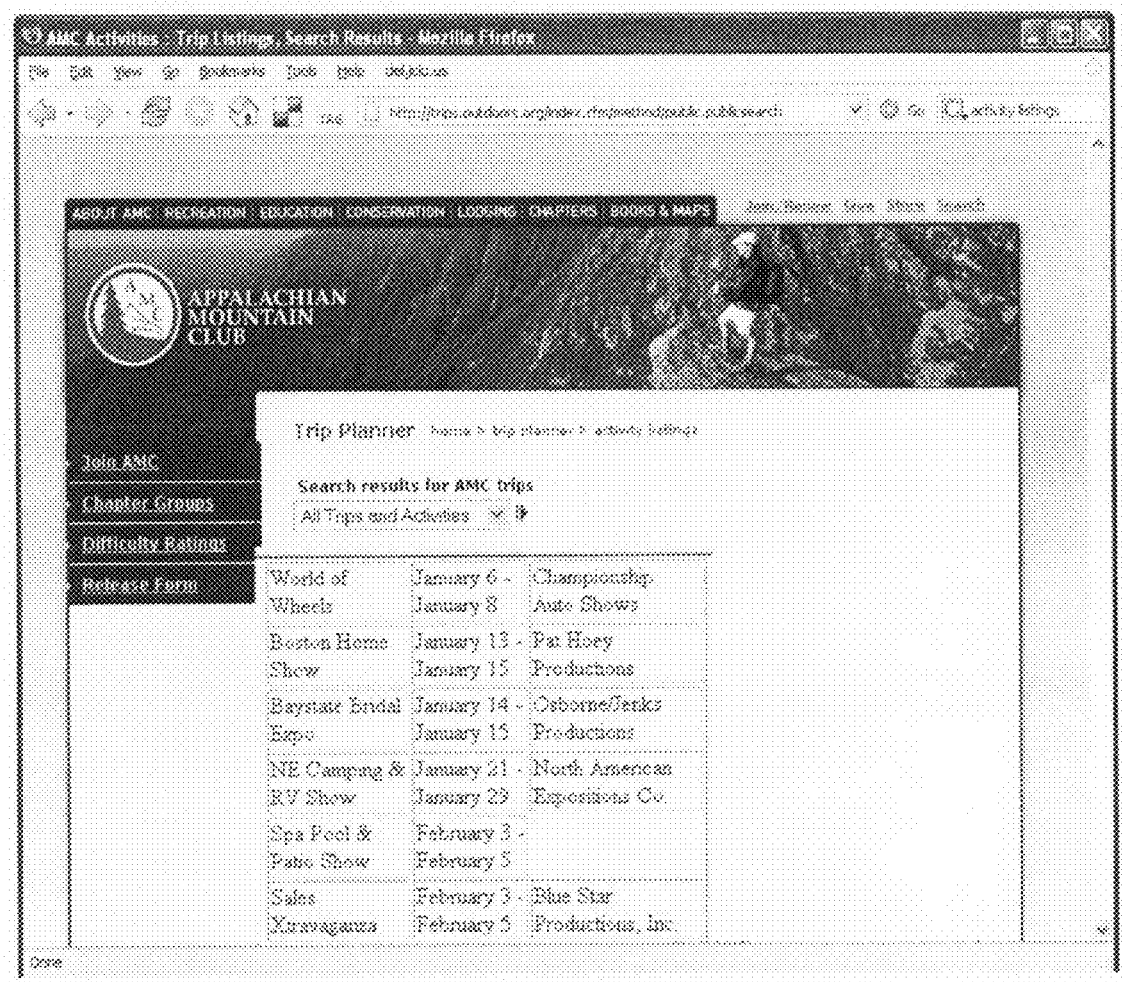
FIG. 11 is an example of a personalized Web page of activities embedded in a Web publisher's own Web site.

In Step 1005, Web Publisher 1001 has now configured a personalized Web page on the Publishing System 110 which can be accessed from his or her own Web site by link or by including it as a frame or table inside one of the Web Publisher's 1005 own Web pages. FIG. 11 shows an example of this, where the activity listings from Visual Representation of Web Scraping in Action 508 have been inserted into a Web Publisher's 1001 Web page. This personalized Web page will fill in automatically with activity data. This stream of information can run freely from the database to the online community, or each event can be moderated individually for approval before being presented to the online community.

Then, in Step 1004, the Online Community 1002 adds content such as reviews, photographs, interviews, and ratings. This content may be free or it may be compensated for by the Web Publisher 1005.

Then, in Step 1006, the Web Publisher 1001 configures rules for how the content created in Step 1004 by the Online Community 1002 is to be sold, if at all. The community's reviews in plain text, and photographs with captions can be bought and sold.

The key problem of selling content created by a community is that the overall quality of volunteers is usually amateurish and not very good. However, in Step 1007, the Online Data Market 1000 can help the Web Publisher 1001 moderate the content and separate the good from the bad by assigning a utility score to the content that members of the Online Community 1002 are contributing. Based on these utility scores, the Web Publisher 1001 can approve content for sale through the Online Data Market 1000, or manually intervene to remove accidentally or maliciously erroneous content.

In Step 1007, different types of content require different utility scoring algorithms. The quality of the submission can be automatically judged based on (a) statistics involving the words in the plain text and photograph captions; (b) how often a Web visitor clicks on the content; (c) how long a Web visitor spends looking at the content; and (d) explicit ratings given by Web visitors. Some users may be trusted and have immediate permission to sell information into the Online Data Market 105 on behalf of the online community.

Then in Step 1008, a different Web Publisher 1003 wants to draw information from the Online Data Market 1000 for its own Web Community 1004. This may be a selling—the Web Publisher 1003 may charge to publish any listing. Or, the data may be valuable enough that the Web Publisher 1003 is buying it from Web Publisher 1001. Web Publisher 1003 configures the system to determine which communities information will be drawn from, what prices are reasonable to pay, and whether content will be sparse or deeply filled in. Web Publisher 1003 can also outsource the entire moderation of the event stream through the Online Data Market 1000. This would be similar to one DJ selling a playlist of music to another DJ every day.

Based on demand and that configuration, in Step 1009 the Online Data Market 1000 determines the appropriate prices and handles the transition of money. In this case, instead of trading purely for money, Web publishers 1001, 1003 accrue "points", similar to how airlines use "air miles". Although these points can be redeemed for cash, they can also be used to provide services for an online community. For example, if Bugaboo Creek Steakhouse has an advertisement with a coupon good for $15 off a meal, the publisher 1001 may spend points to purchase 250 of these coupons and present them to his or her online community. Creating incentives for the community to provide content, the Web publisher can take a cut and then finance the original incentives by sales into the Online Data Market 1000.

Additionally, in Step 1010, algorithms can select and suggest content for the end-user based on their explicit tastes (ratings) and their implicit tastes as demonstrated by their browsing history and the community they have chosen to join. These algorithms can select for the most relevant content and serve to sort lists of events with the ones most likely to be of interest on the top. Additionally, advertisements can be selected by an algorithm that matches ads with the end-users most likely to click on them.

Finally, in Step 1011, Ratings that are contributed by the Online Community 1006 need to be combined with the ratings from other communities. This is done using a weighted scoring system that is balanced from what the end-users tastes seem to be, as recorded by the history of browsing events.

In addition to this, a Publishing System 110 allows any Web publisher to manage the online community, and annotate events and activities with additional expert content, such as reviews, ratings, and photography. An Advertising System 109 allows advertisers to post their own ads and configure the system with hints about which events and category tags would be most relevant to the ad. This information is then used when determining which ads to show to end-users.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer program product embodied on a computer readable medium for extracting information from a collection of sources, comprising:
   computer code for displaying an interface that is operable to allow a user to create at least one template associated with at least one source utilizing at least one menu that includes a plurality of options that are capable of being selected by the user, the options of the at least one menu being dynamically generated by automatically generating the options of the at least one menu during creation of the at least one template;
   computer code for allowing the user to identify persistent text, such that the persistent text becomes part of the at least one template;
   computer code for allowing the user to identify at least one URL, such that the at least one URL becomes part of the at least one template;
   computer code for allowing the user to identify at least one region associated with the source by specifying at least two entities associated with the source with respect to which desired information resides, such that a result of the specifying becomes part of the at least one template;
   computer code for determining at least one relationship to other data, the at least one relationship being part of the at least one template;
   computer code for processing text of the source to automatically identify at least one data type associated with the text of the source, by identifying at least one first word of the text of the source and automatically identifying at least one different second word that is representative of a type associated with the at least one first word, wherein the computer program product is operable such that the at least one data type is automatically identified based on a format of the text of the source;
   computer code for gathering or processing data from the source, utilizing at least one of the persistent text of the at least one template, the at least one URL of the at least one template, the at least one region of the at least one template, the at least one relationship of the at least one template, or the at least one data type;
   computer code for displaying the data from the source;
   computer code for identifying errors associated with the data from the source; and
   computer code for reporting the errors for review.

2. The computer program product of claim 1, wherein the at least one data type is a likely data type.

3. The computer program product of claim 1, wherein the other data is located on the source.

4. The computer program product of claim 1, wherein the other data is located at a location other than on the source.

5. The computer program product of claim 1, wherein the at least one menu includes a drop-down menu.

6. The computer program product of claim 1, wherein the at least two entities associated with the source include locations on the source.

7. The computer program product of claim 6, wherein the at least two entities associated with the source include a start location and an end location.

8. The computer program product of claim 1, wherein the at least one data type includes a noun.

9. The computer program product of claim 1, wherein the template includes a copy of the source.

10. The computer program product of claim 1, wherein the template includes an annotated template.

11. The computer program product of claim 1, wherein the at least one data type includes at least one of an activity and a venue.

12. The computer program product of claim 1, wherein the data from the source is gathered utilizing contextual clues.

13. The computer program product of claim 1, wherein the data from the source is gathered utilizing an identified anchor on the source.

14. The computer program product of claim 1, wherein the data from the source is gathered utilizing adjacency relationships.

15. The computer program product of claim 1, and further comprising computer code for advertising in association with the display of the data from the source.

16. The computer program product of claim 1, wherein the at least one menu is accessed via a right-click of a mouse.

17. The computer program product of claim 1, wherein the data from the source is gathered.

18. The computer program product of claim 1, wherein the data from the source is processed.

19. The computer program product of claim 1, wherein the persistent text includes an anchor word.

20. The computer program product of claim 1, wherein the at least one source includes at least one source page.

21. The computer program product of claim 1, wherein specifying the at least two entities associated with the source with respect to which the desired information resides includes specifying at least two locations on a source page between which the desired information resides.

22. The computer program product of claim 1, wherein determining the at least one relationship to the other data includes allowing the user to determine the at least one relationship to the other data.

23. The computer program product of claim 1, wherein automatically identifying the at least one different second word that is representative of the type associated with the at least one first word includes automatically identifying the at least one different second word that is representative of the type of the at least one first word.

24. A method for extracting information from a collection of sources, comprising: displaying an interface that is operable to allow a user to create at least one template associated with at least one source utilizing at least one menu that includes a plurality of options that are capable of being selected by the user, the options of the at least one menu being dynamically generated by automatically generating the options of the at least one menu during creation of the at least one template;
   allowing the user to identify persistent text, such that the persistent text becomes part of the at least one template;
   allowing the user to identify at least one URL, such that the at least one URL becomes part of the at least one template;

allowing the user to identify at least one region associated with the source by specifying at least two entities associated with the source with respect to which desired information resides, such that a result of the specifying becomes part of the at least one template;

determining at least one relationship to other data, the at least one relationship being part of the at least one template;

processing text of the source to automatically identify at least one data type associated with the text of the source, by identifying at least one first word of the text of the source and automatically identifying at least one different second word that is representative of a type associated with the at least one first word, wherein the at least one data type is automatically identified based on a format of the text of the source;

gathering or processing data from the source, utilizing at least one of the persistent text of the at least one template, the at least one URL of the at least one template, the at least one region of the at least one template, the at least one relationship of the at least one template, or the at least one data type;

displaying the data from the source;

identifying errors associated with the data from the source; and reporting the errors for review.

* * * * *